United States Patent [19]
Marek

[11] Patent Number: 6,082,799
[45] Date of Patent: Jul. 4, 2000

[54] MOBILE AMBULATORY SURGERY CENTER

[76] Inventor: Neal Marek, 2105 JadeLeaf Ct., Las Vegas, Nev. 89134

[21] Appl. No.: 08/989,736

[22] Filed: Dec. 15, 1997

[51] Int. Cl.$^7$ ...................................................... A61G 3/00
[52] U.S. Cl. ......................... 296/24.1; 296/26.12; 296/19
[58] Field of Search .............................. 296/24.1, 26.12, 296/19, 171, 26.13

[56] References Cited

U.S. PATENT DOCUMENTS

| | | |
|---|---|---|
| 4,181,347 | 1/1980 | Clark . |
| 4,425,978 | 1/1984 | Star . |
| 4,449,746 | 5/1984 | Clark . |
| 4,570,733 | 2/1986 | Star . |
| 4,712,822 | 12/1987 | János . |
| 4,743,059 | 5/1988 | Leguev . |
| 4,892,349 | 1/1990 | Sargent ..................................... 296/156 |
| 4,915,435 | 4/1990 | Levine . |
| 5,398,986 | 3/1995 | Koob . |

OTHER PUBLICATIONS

Calumet Coach Specialized Mobile Units Catalogue by Calumet Coach Calumet City, Illinois pp. 1, 2, 3, 4, 5, 7, 9, 11.

Mobile Tech Inc. Specialty Vehicles Catalogue by Mobile Tech Inc. Sanford, Florida pp. 3, 4.

Cutting Edge Mobile Surgery Technology by Mobile Medical International Corporation St. Johnsbury Vermont pp. 1, 2, 3.

Moex Mobile Health Clinics Catalogue by Moex Corporation Albany, Oregon pp. 1, 2, 3, 4, 5, 6.

*Primary Examiner*—Dennis H. Pedder
*Assistant Examiner*—Mickki D. Murray

[57] ABSTRACT

A mobile ambulatory surgery center comprises a motor vehicle in which patients can schedule and undergo nonemergency, nonlife threatening, elective surgical procedures. The motor coach has a front driver's cab and a main body section which houses the ambulatory surgery center. Within the main body section, there are designated and separate sterile and nonsterile areas. An expandable portion of the main body enlarges the sterile area and creates a patient flow pattern which protects the integrity and sterility of the operating room. The separation of sterile and nonsterile areas allows the vehicle to have a business and a medical section and function autonomously as an ambulatory surgery center.

20 Claims, 3 Drawing Sheets

MOBILE AMBULATORY SURGERY CENTER

BACKGROUND—FIELD OF INVENTION

This invention relates to surgery centers, specifically to mobile ambulatory surgery centers.

BACKGROUND—DESCRIPTION OF PRIOR ART

Surgery is traditionally performed in hospitals. Both emergency and nonemergency types of surgery were performed in hospitals. In the 1970's, freestanding ambulatory surgery centers were developed. Freestanding ambulatory surgery centers are buildings separate from a hospital where nonemergency, non-life-threatening, elective surgeries can be performed. The shift of outpatient surgery to ambulatory surgery centers lessened the surgical caseload on hospitals. Surgery is less costly at an ambulatory surgery center since surgical centers are much smaller. Hospitals have many departments and must have and maintain extensive equipment. Patients can sleep overnight or for several weeks at hospitals. Patients can have their surgery at ambulatory surgery centers and then go home the same day to recover.

Hospitals perform the major emergency surgeries, while ambulatory surgery centers specialize in elective outpatient surgical cases. Both hospitals and ambulatory surgery centers are regulated and licensed by state and federal guidelines and requirements. The intent of these regulations is to ensure that patients receive the best care.

Both hospitals and ambulatory surgery centers are designed with designated sterile and non-sterile areas to establish a designated patient traffic pattern. The designated patient traffic pattern allows the continual use of a facility. Personnel in nonsterile areas do not pose a contamination risk to surgery and procedures being performed in the sterile area. A major goal of the design of a facility is that the operating room is protected from outside microorganisms. This is done to prevent contamination of the operating room by outside microorganisms which can cause infection in patients undergoing surgery. The aseptic sanctity of the operating room (OR) must always be maintained.

The nonsterile area of a hospital or ambulatory surgery center generally includes a patient waiting room, an admitting room, a business office and a changing room. The non-sterile area is where business can be conducted.

The nonsterile area of a facility allows the patient to enter the facility's admitting area in their street clothes and complete any necessary paperwork prior to surgery. Any person who will give the patient a ride home after surgery is able to wait in a waiting room in the nonsterile area. Nonmedical business can be conducted here without interfering with the surgical area. The patient then enters a change room and discards their microorganism-contaminated street clothes for a clean surgical gown.

The sterile area, where surgery will be performed, includes a preop and recovery room, an OR, a nursers station, a clean work room and a soiled work room. Access to the sterile area is controlled and limited to personnel dressed only in surgical attire. There are physical barriers that separate the sterile and nonsterile areas to prevent contamination of the operating room by outside microorganisms. The patient, after being granted access to the sterile area, can then be prepared and have their surgery performed.

The designation and separation of sterile and non-sterile areas not only maintains the integrity of the operating room, but allows the hospital and ambulatory surgery center to function as an autonomous business. Hospitals and ambulatory surgery centers perform medical care but they must also be designed to conduct the business aspect of their facility. The goal of the design of a facility is that the OR is protected from outside microorganisms. The aseptic sanctity of the OR must be maintained.

A goal of the design of a facility is to maintain the aseptic sanctity of the OR. The OR is the area most protected from bacteria contamination. Licensing and certification is only given to facilities that meet this goal.

A facility with designated sterile and nonsterile areas not only allows the OR to remain aseptic for the patient's surgery, but the designated patient traffic flow pattern allows continuous reuse of the surgical facility. The designated flow pattern prevents cross contamination of the sterile and nonsterile areas. The designated areas and traffic pattern allow the facility to conduct their nonmedical business and also allow the entire facility to function as an autonomous business.

In an emergency disaster where there are life-threatening injuries that require immediate medical treatment, contamination of the surgical operating room with microorganisms is justified. However, for scheduled elective nonemergency outpatient surgery, contamination of the operating room by microorganisms is not justified. Emergency surgery can be performed anywhere, even on the ground. Sterile surgery can only be performed in an environment that has been designed and arranged to keep microorganisms out of the most secure area of the facility, the OR.

Previous mobile units are able to provide emergency operating services only as required in wartime or a major disaster. Emergency surgery has been performed in the past in ambulances, military transport vehicles, and on stretchers in trucks. Surgery can be performed in an ambulance when it is an emergency. However an ambulance does not meet the criteria for performing sterile, elective outpatient surgical procedures.

Previous mobile units have no ability or capacity to perform nonemergency outpatient surgeries with an aseptic OR. They could not be used on a continuous basis, one patient after the other, while maintaining an aseptic OR. Previous mobile units could not function autonomously as an ambulatory surgery center as there was no capacity to perform the business portion of the patient's visit.

Previous mobile units could not be licensed and certified as ambulatory surgery centers. Previous units did not prevent outside microorganisms from being brought on board, nor did they prevent the spread of microorganisms once it was on board. Previous units did not prevent cross contamination of the sterile and nonsterile areas. Previous units did not establish or maintain the sanctity of an aseptic OR. Previous units could not conduct nonmedical business and therefore could not be licensed and certified as an ambulatory surgery center.

U.S. Pat. No. 4,570,733 to Starr (1986) discloses an emergency mobile hospital unit capable of being transported to the scene of a major airline crash and providing emergency medical treatment. This unit can function under emergency situations, such as a plane crash. However any surgeries performed would be contaminated by outside microorganisms. There is no provision to prevent microorganisms from being brought onto the mobile unit along with the injured patients. There is no provision to prevent the spread of microorganisms. Thus the bacteria would spread throughout the unit and contaminate any surgery. The contamination is justified due to the emergency life-or-death situation, such as a major airline crash, but would not be justified for elective, nonemergency outpatient surgery.

U.S. Pat. No. 4,915,435 to Levine (1990) discloses a mobile operating room that is capable of invasive surgeries. This unit can function in a life-or-death situation, such as in the military during wartime. Medical personnel and patients must enter directly into the preoperative/recovery area, a sterile area. Thus microorganisms can enter on their clothes and also through the air right into the sterile area. The sterile area is contaminated with microorganisms. Once inside the preop/recovery area, the microorganisms will be tracked into the main OR.

U.S. Pat. No. 4,743,059 to Legneu (1987) discloses a mobile sanitary unit which can be transported to the site of a disaster. Sterile surgery can be performed on one patient in the operating room. However, it is not possible to prepare a second patient for surgery or allow the first patient to recover from surgery. The recovery time from surgery can last from two to ten hours, depending upon the extent of the surgery. This occupies the entire facility and the OR. To free the OR for the next crisis victim, the postsurgical patient can be moved from the mobile unit to a tent outside the unit to recover. However, this puts the postsurgical patient at risk for contamination and infection. Also, the entire mobile unit must be sanitized if the aseptic integrity of the OR is to be regained for the next surgery. This is a very time-consuming process. In an emergency situation, sanitizing the unit can be omitted because the risk of delaying life-saving surgery justifies contamination of the OR. In an outpatient surgery that is nonemergency, contamination of the OR is never justified.

All of the mobile units heretofore known do not have a designated nonsterile and sterile area. The patient cannot enter the OR without bringing in microorganisms. All surgery will be contaminated and place the patient at risk for infection. In the previous units it is not possible to conduct nonmedical business and function autonomously. The previous units do not meet the licensing and certification requirement for an ambulatory surgery center. As stated, previous mobile units can provide emergency life-saving surgery services, but have no capacity to perform elective outpatient surgeries on a continuous basis. Accordingly, the disadvantages of the prior mobile units are:

(a) There are no designated sterile and nonsterile areas which prevent the spread of microorganisms within the unit.
(b) There is no way for the patient to be brought into the operating room without bringing in microorganisms.
(c) The surgery performed in the operating room will be contaminated due to microorganisms.
(d) Since the operating room will be contaminated, only emergency life-threatening surgery is justified. Elective outpatient surgery can not be performed in the contaminated area.
(e) There is no way to conduct the nonmedical business paperwork of a patient's visit.
(f) The patient's driver is not able to wait.
(g) Prior mobile units cannot function autonomously as a licensed ambulatory surgery center.
(h) Sanitizing the entire unit is required between cases to maintain the aseptic integrity of the operating room. This is a time-consuming process and would limit the number of surgeries being performed.
(i) Transporting the vehicle on public roads and highways requires a commercial drivers license.

OBJECTS AND ADVANTAGES

Accordingly, several objects and advantages of the present invention are:

(a) To provide a mobile ambulatory surgery center with designated sterile and nonsterile areas to prevent the spread of microorganisms within the unit.
(b) To provide an ambulatory surgery center with a patient flow pattern that will allow the patient to reach the O.R. without bringing microorganisms into the O.R.
(c) To provide an operating room that can be used on a continuous basis and maintain an aseptic environment.
(d) To provide an improved operating room for elective outpatient nonemergency surgeries.
(e) To provide a mobile ambulatory surgery center with an admitting area to conduct the nonmedical business portion of a patient's visit.
(f) To provide a mobile ambulatory surgery center with a waiting room for the patient's driver to wait.
(g) To provide a mobile ambulatory surgery center with designated sterile and nonsterile areas and a designated patient traffic pattern allowing it to be licensed and function autonomously as an ambulatory surgery center.
(h) To provide a mobile ambulatory surgery center where patients can continuously undergo surgery in an aseptic operating room with sanitizing of only the operating room required in between cases.
(i) To provide a mobile ambulatory surgery center that can be transported without a commercial drivers license. advantages of the mobile ambulatory surgery unit are that it can be driven to rural areas and save patients the time and expense of having to travel to a large city to have their surgery performed. The mobile unit can also be utilized by physicians who wish to have an ambulatory surgery center facility at their location. This will be convenient for the physician and patient who do not have to travel to a ambulatory surgery center. Still further objects and advantages of my invention will become apparent from a consideration of the drawings and ensuing description.

DRAWING FIGURES

REFERENCE NUMERALS IN DRAWINGS

Figure 1:
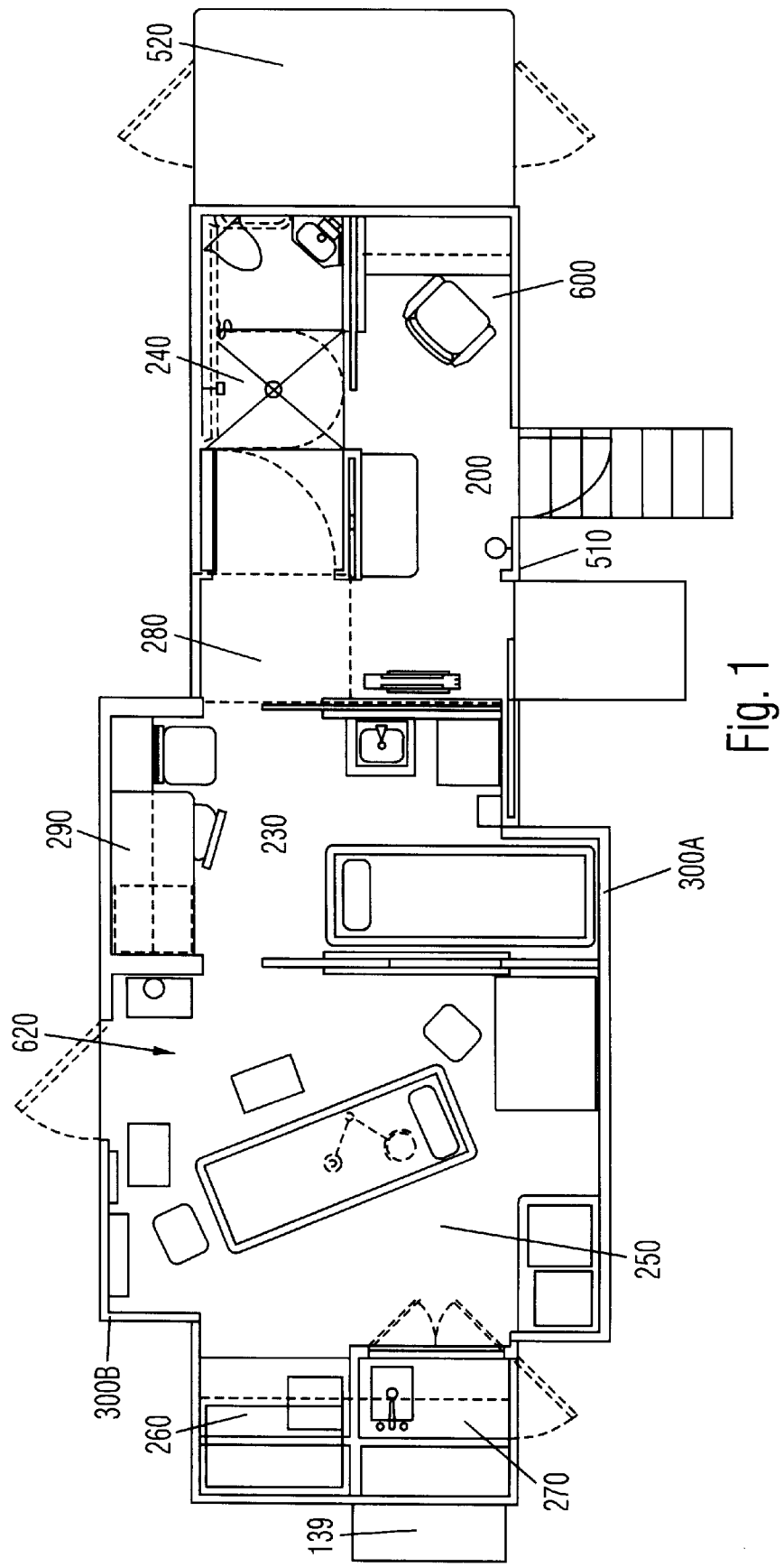
FIG. 1 shows a top plan view of a mobile ambulatory surgery center in accordance with the invention.

101 Portable under counter refrigerator
102-A Counter top
102-B Counter top
103-A Upper cabinet
103-B Upper cabinet
103-C Upper cabinet
103-D Upper cabinet
104 Chair for preop patient
105 Chair for control station nurse
106 Generator
107 Oxygen tank and stand
108-A Suction machine
108-B Suction machine
109 Wheelchair
110-A Stool
110-B Stool
111-A Surgical cart
111-B Surgical cart
112 Anesthesia machine
113-A Gurney in prone position
113-B Gurney in prone position 114 Scrub sink
115 Autoclave
116 Janitor floor sink and base cabinet
117 Soiled storage access panel
118 Retractable wheelchair lift
119 Retractable main entry steps
120 Patient waiting seats, retractable for wheelchair clearance
121 Chair for admitting nurse
122 X-ray illuminator
123 Toilet
123-A Hand sink
124-B Hand sink
125 Shower nozzle
126 Shower curtain
127 Grab bar
128 Clock and elapse timer
129 Swing door
130-A Pocket door
130-B Pocket door
130-C Pocket door
130-D Pocket door
130-E Pocket door
131 Emergency exit panel
132 Fresh and gray water tanks
133 Door with air tight seals
134 Overhead surgical light
135-A Portable fire extinguisher
135-B Portable fire extinguisher
136 Driver's cab
137 Lockers for patients and staff
138 Shower curtain track
139 Ventilation and air conditioning system
140 Main entry swing door
141 Clothing hooks
142 Sign.
143-A Driver's cab door
143-B Driver's cab door
144-A Intercom
144-B Intercom
144-C Intercom
145-A Call system
145-B Call system
145-C Call system
145-D Call system
146 Telephone
147 Computer
200 Admitting
230 Preop/Recovery Room
240 Change room/restroom
250 Operating room
260 Clean room
270 Soil work area
280 Surgery staging area
290 Nurses station
300-A Pull-out
300-B Pull-out
510 Body section
520 Driver's cab
600 Nonsterile area
620 Sterile area

SUMMARY

In accordance with the present invention, a mobile ambulatory surgery center unit comprises a motor vehicle capable of being driven on the highway and having a main body section. The main body section includes and is arranged into designated sterile and non-sterile areas. The main body section has a portion that moves outward and enlarges the sterile area which creates a patient traffic flow pattern that allows patients to have surgery performed in a sterile operating room on a continuous basis.

DESCRIPTION—FIG. 1—Plan View

FIG. 1 shows a motor coach 500 in which a mobile ambulatory surgery center according to the invention is housed. The center has a driver's cab 520 and a central body section 510. Within central body section 510 is a sterile area 620 and a nonsterile area 600.

The center has an admitting area 200, a change room 240, and a surgery staging area 280 within nonsterile area 600.

A nurse's station 290, a preop/recovery room 230, an operating room 250, a clean work room 260, and a soiled work area 270 are built within sterile area 620. Retractable pullouts 300-A and 300-B are of the type that are well known and available in the industry. When the vehicle is parked, retractable pullouts 300-A and 300-B enlarge sterile area 620. The center has a ventilation and air conditioning system 139.

FIG. 2—Plan View

Figure 2:
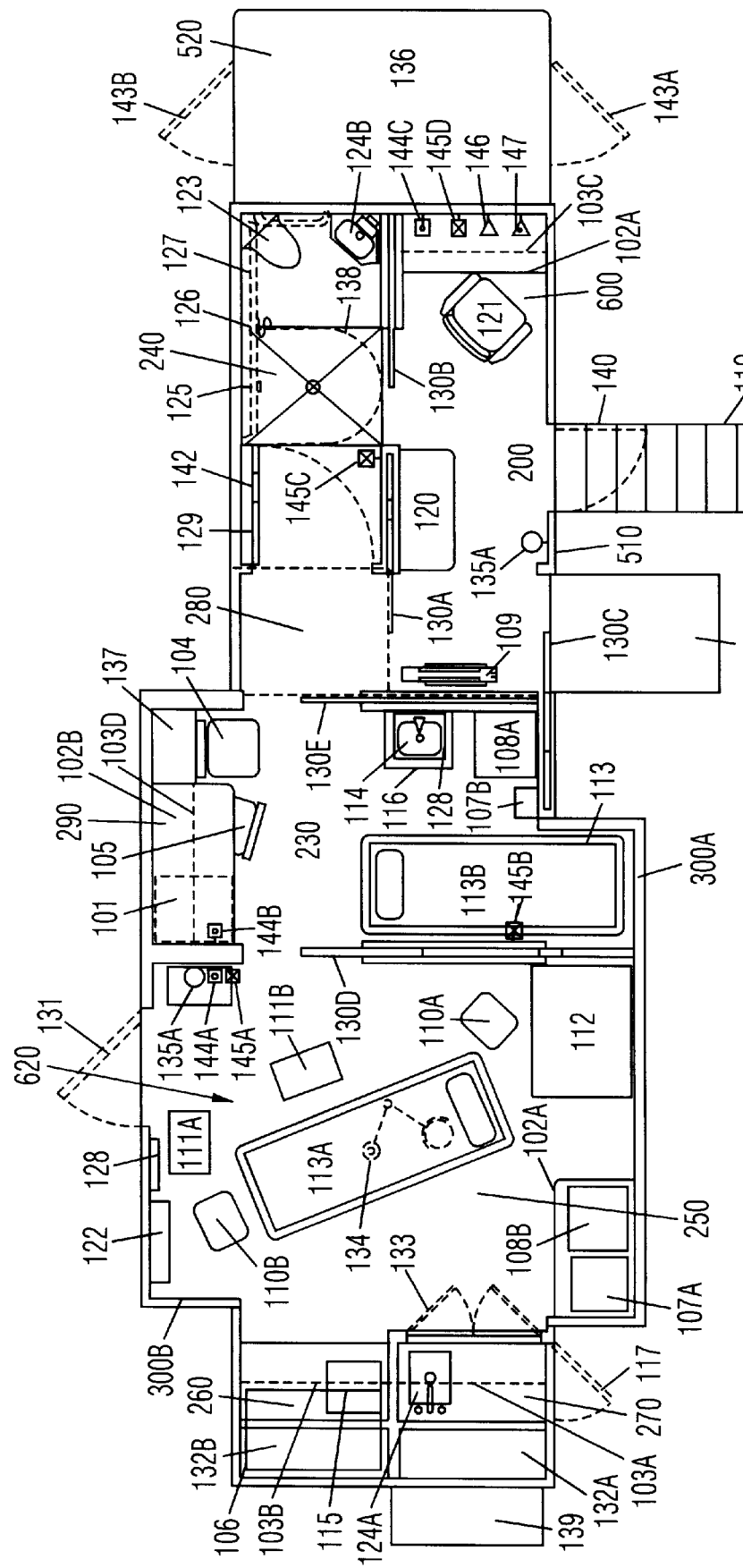
FIG. 2 shows a top sectional view of the mobile ambulatory surgery center.

As show in FIG. 2, the center has driver's cab doors 143-A and 143-B which allow entrance into driver's cab 520. Retractable main entry steps 119 and a retractable wheelchair lift 118 allow entrance into admitting area 200.

Admitting area 200 has a patient waiting chair 120 and a chair 121 for the admitting clerk. Admitting area 200 also has an intercom 144-C, a call system 145-D, a telephone 146, and a computer 147. Admitting area 200 also has an upper cabinet 103-C and a countertop 102-A, and a portable fire extinguisher 135-A. A pocket door 130-B allows patients and personnel to leave admitting area 200 and enter change room 240. A toilet 123, a shower curtain track 138, a shower nozzle 125, a shower curtain 126, a grab bar 127 are located in the change room. Also, this room has a call system 145-C. A swing door 129 allows the patient to leave the change room and enter into surgery staging area 280. Door 129 has a sign 142 which reads "Proper Attire Required Beyond This Point".

Surgery staging area 280 has a pocket door 130-E which allows the patient to enter preoperative area 230. Pocket door 130-A allows the patient to exit area 280 and return to admitting area 200 after their surgery. A nurse's station 290 is located in the preop and recovery area 230. Nurse's station 290 has a chair 104 for the patient, an upper cabinet 103-D, and a countertop 102-B. A chair 105, a refrigerator 101, and an intercom 144-B are situated at the nurse's station.

Preop and recovery room 230 has a gurney 113-B, a call system 145-B, a wheelchair storage area 109, an oxygen tank and stand 107-B, a suction machine 108-A, a clock 128, a scrub sink 114. Scrub sink 114 has a cabinet with a janitor's floor sink 116. A pocket door 130-D allows the patient to leave room 230 and enter into operating room 250. Operating room 250 has a gurney 113-A, a surgical overhead light 134, an anesthesia machine 112, an oxygen tank and stand 107-A, a countertop 102-A, a stool 110-B, an x-ray illuminator 122, a clock 128-B, a surgical cart 111-A, a surgical cart 111-B, a fire extinguisher 135-A, an intercom 144-A, and a call system 145-A.

An emergency exit panel 131 allows personnel to exit in case of a fire in the operating room. A clean work area 260 has an autoclave 115. An upper cabinet 103-B is provided within the clean storage area 260.

A pair of doors with airtight seals 133 separate soil work area 270 from OR 250. Within soiled work area 270 is an upper cabinet 103-A and a hand sink 124-A. An access panel 117 allows access into soiled work area 270 from outside motor coach 500.

A gray water area 132-A is located behind soil work area 270. A clean water tank 132-B is located behind clean work area 260. An emergency generator 106 is located behind clean water tank 132-B.

FIG. 3—Side View

A main entry swing door 140 provides entrance into the admitting area. A pocket door 130-C allows handicap access into the admitting area. A soiled storage access panel that can be accessed from outside the vehicle is provided. A ventilation and air conditioning system 139 provides above atmospheric pressure.

OPERATION

The mobile surgery center has designated sterile and nonsterile areas and a patient traffic flow pattern which ensures and maintains the sterility of the OR. It allows motor coach 500 to function as a mobile ambulatory surgery center for elective, nonemergency surgeries.

The vehicle can be easily and readily driven along the highways and roads to different locations to function as a mobile ambulatory surgery center. Once parked at the site where surgery will be performed, expandable sides 300-A and 300-B (FIG. 1) can be retracted outwardly to enlarge the sterile area. The enlarged sterile area helps create a traffic flow pattern which allows sterile surgery to be performed in the OR. These sides can be expanded in a matter of minutes to increase the sterile area.

The entire arrangement of unit 510 is consistent with that of a free-standing ambulatory surgery center. It has designated sterile and nonsterile areas 600 and 620 which protect OR 250 from contamination.

An admitting clerk meets the patient in admitting area 200 and helps the patient complete their paperwork. The patient flow pattern is designed to protect the sterility of the OR from contamination. The patient traffic flow pattern allows the continued use and reuse of the entire facility with sanitation of OR 250 easily performed between cases.

Figure 3:
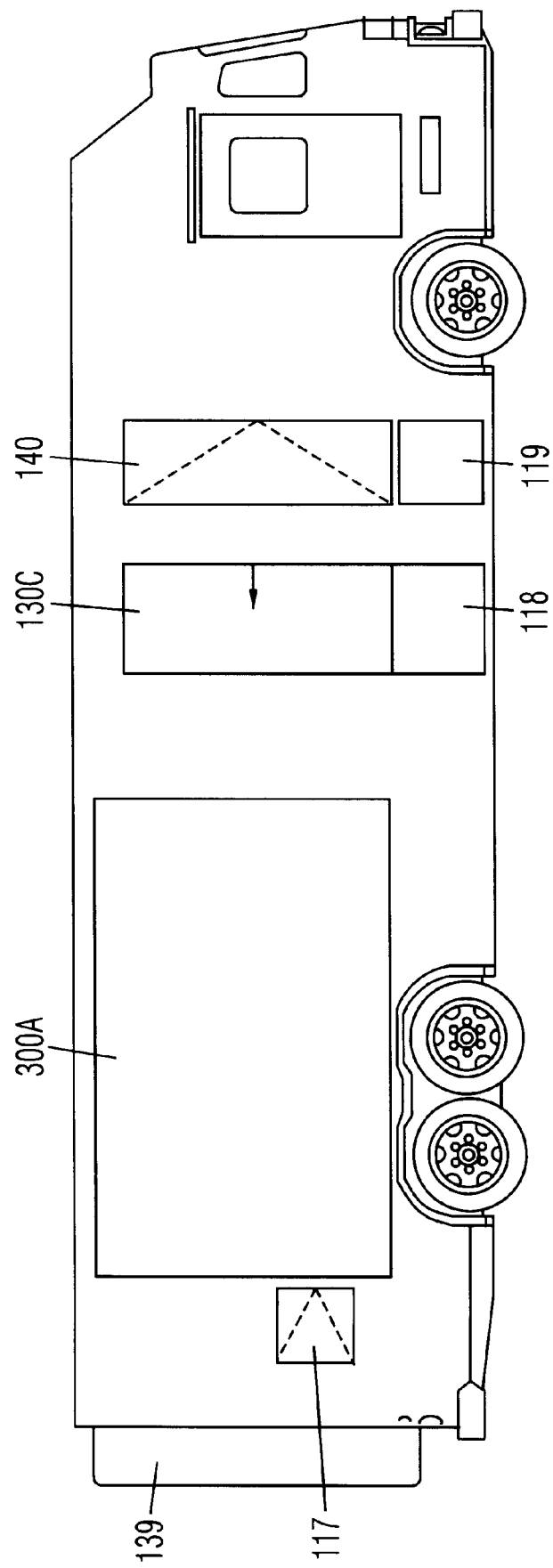
FIG. 3 shows a side view of the passenger side of the mobile ambulatory surgery center.

The patient enters admitting area 200 by stairs 119 (FIG. 3), or wheelchair lift 118 if necessary. Using chair 120 (FIG. 2), the patient can complete all the necessary preoperative paperwork prior to surgery. The person who will be driving the patient home after surgery can also wait in chair 120.

Nonsterile work can be performed in admitting area 200 on a continuous basis without affecting the sterility of OR 250. The design of nonsterile area 600 is so arranged so that personnel and patients enter into the unit in nonsterile clothes and are prepared for surgery before proceeding into sterile area 620.

The patient enters admitting area 200. The patient flow pattern is designed so that the patient can change from street clothes into a surgical gown. Medical personnel also change their clothes and put on surgical garments. Change room 240 (FIG. 1) is entered by the patient from the admitting area to change into a surgical garment prior to surgery. This physical changing of clothes prevents outside microorganisms from being brought into the OR. FIG. 2 shows door 129 through which the patient exits change room 240 and enters into surgery staging area 280. Sign 142 prevents unauthorized entry into the surgical staging area 280. The patient is met in the surgical staging area by a nurse who is sitting at nursing station 290 and who controls access to the sterile area. All personnel are restricted from entering the sterile area unless they are dressed appropriately in surgical garments. The nurse's station 290 is situated so that the nurse can protect this area.

The patient enters into the preoperative/recovery room 230 via pocket door 130 to be prepared for surgery. The nurse at station 290 has a work space available, including a countertop 102-B and cabinets 103-D for storage of supplies and medications. The nurse can communicate with the admitting clerk or the operating room as necessary via intercom 144-B. The patient sits in chair 104 to be prepared for surgery by the nurse. The patient can also be prepared on gurney 113-B, depending upon the type of surgery to be performed.

Once the patient is ready for surgery, the patient is brought into OR 250 which has the necessary equipment and supplies for the anesthesiologist and surgeon to anesthetize and perform the surgery.

The surgeon will scrub at scrub sink 114 prior to performing the surgery. The OR is protected from airborne microorganisms by positive air pressure provided by ventilation system 139. The OR has the highest positive air pressure in the facility and admitting area 200 has the lowest. This pressure differential ensures that air flows from the OR outward to prevent airborne microorganisms from reaching the OR.

After the surgery is finished, the patient is taken by wheelchair 109 to the nursers station 290 and is given postoperative prescriptions and instructions. The patient is then wheeled through door 130-E and door 130-A back into admitting area 200 and discharged to the person who will drive the patient home. The patient will be lowered on the retractable wheelchair lift 118 off motor coach 500.

After surgery, OR 250 is prepared for the next surgical case. The dirty linen and supplies which are generated during the operation are placed in the soiled work area 270.

Airtight doors 133 are opened and the biohazardous waste that was generated from the operation is placed in the storage cabinet 103-A in area 270. The biohazardous waste is removed from motor coach 500 through the soiled storage access panel 117 from outside the vehicle. Removing biohazardous waste prevents the spread of microorganisms. OR 250 is sanitized with equipment from janitor's floor sink 116. After cleaning, new supplies are brought from clean work area 260 and the OR is then prepared for the next operation. The facility is then ready to proceed with the next patient. The next patient is waiting in preoperative area 230 to be taken to the OR. As soon as the first operation is finished and the room was sanitized, the second patient can be brought in.

SUMMARY, RAMIFICATIONS AND SCOPE

Accordingly, the reader will see that the mobile ambulatory surgery center of this invention can be used to perform nonemergency, elective surgery on patients in a sterile operating room.

Furthermore, the center has the following additional advantages:

a. The designated sterile and nonsterile areas prevent or reduce the contamination of microorganisms from entering and spreading within the ambulatory surgery center.

b. The patient traffic will flow in a pattern which will prevent and restrict the flow of microorganisms from reaching the operating room.

c. Since the operating room is protected from microorganism, the surgeries can be performed in an aseptic manner.

d. Since the sterility of the operating room can be maintained, elective outpatient, nonemergency surgeries can be performed.

e. Since there is both a nonsterile area for business and a sterile area for medical treatment, the patient can complete their business portion of their visit.

f. There is a waiting area so the patient's driver will have a place to wait.

g. Since it has designated sterile and nonsterile areas, a business portion and a medical portion the mobile ambulatory surgery center can function autonomously and be licensed or certified as an ambulatory surgery center.

h. The mobile ambulatory surgery center, since it is protected from microorganisms with designated sterile and nonsterile areas, can provide continuous ongoing aseptic operating room with only sanitation of the operating room required between cases.

i. The mobile ambulatory surgery center can be driven to different locations on the highway without the need for a commercial driver's license.

Although the description above contains many specificities, these should not be construed as limiting the scope of this invention, but as merely providing an illustration of a presently and preferred embodiment. Other embodiments are possible. For example, the design of the sterile area can be changed. Portions of the sterile area can be made smaller or larger or even combined. The portions of the sterile area can be rearranged in a different design. The design of the nonsterile area can be changed. The areas can be made larger or small or some portions of the nonsterile area combined. The portions of the nonsterile area can be rearranged. The expanding portion of the main body may be used to enlarge the nonsterile area. The driver's cab can be utilized as an admitting area. Thus, the scope of the invention should be determined by the intended claims and their legal equivalents, rather than the examples given.

I claim:

1. A mobile ambulatory surgery center equipped with medical equipment and capable of being driven on the highways to different locations to provide a surgical site thereat comprising:

(a) a motor vehicle capable of being driven on the highways and housing a main body section,
    (b) said main body section having sterile and nonsterile areas,
    (c) said main body section having an expandable portion which moves outwardly to enlarge said sterile area so as to provide a relatively large surgical area where patients can undergo elective, nonemergency outpatient surgical procedures,
    (c) said nonsterile area of said main body area also comprising an admitting area and a separate changing area which is positioned between said admitting area and said sterile area,
    (d) said admitting area being separated from said separate changing area by a wall with a changing-area entrance door so that said admitting area and said separate changing area can be completely separated from each other,
    (e) said separate changing area being separated from said sterile area by a wall having a changing-area exit door so that said separate changing area and said sterile area can be completely separated from each other, said separate changing area thereby having two doors, the changing-area entrance door and the changing-area exit door,
    (f) said sterile area also having an exit door leading to an area other than said changing area so that a patient can exit said sterile area without passing through said changing area,
    (g) whereby patients will not be able to enter said sterile area directly from said admitting area, and will not have to pass through said changing area when leaving said sterile area, thereby to decrease the risk of contaminating said sterile area and said patient after surgery.

2. The mobile ambulatory surgery center of claim 1 wherein said center is arranged so that said sterile area exit door leads to said admitting area.

3. The mobile ambulatory surgery center of claim 1, further including a stairway extending into said nonsterile area for allowing nonmedical business to be completed without contaminating said sterile area.

4. The mobile ambulatory surgery center of claim 1, further including a retractable handicap lift extending into said nonsterile area.

5. The mobile ambulatory surgery center of claim 1, further including a nurse's station at an entrance to said sterile area for controlling ingress of persons into said sterile area.

6. The mobile ambulatory surgery center of claim 1 wherein said sterile area contains an operating room equipped with medical equipment for performing surgery.

7. The mobile ambulatory surgery center of claim 6, further including means for providing above-atmospheric air pressure in said operating room to prevent airborne microorganisms from entering and contaminating said operating room.

8. The mobile ambulatory surgery center of claim 6, further including an emergency exit from said operating room.

9. A mobile ambulatory surgery center capable of being driven to different locations and equipped with medical equipment to provide a surgical site, comprising:

(a) a motor vehicle capable of being driven,
    (b) said motor vehicle housing a driver's section and a main body section,
    (c) said main body section being divided into sterile and nonsterile areas,
    (d) said main body section having an expanding section in which elective nonemergency surgical procedures can be performed,
    (e) said nonsterile area having an admitting area and a separate changing area which is positioned between said admitting area and said sterile area,
    (f) said admitting area being separated from said separate changing area by a wall with a changing-area entrance door so that said admitting area and said separate changing area can be completely separated from each other,
    (g) said separate changing area being separated from said sterile area by a wall having a changing-area exit door so that said separate changing area and said sterile area can be completely separated from each other, said separate changing area thereby having two doors, the changing-area entrance door and the changing-area exit door,
    (h) said sterile area also having an exit door leading to an area other than said changing area so that a patient can exit said sterile area without passing through said changing area, (i) whereby patients will not be able to enter said sterile area directly from said admitting area, and will not have to pass through said changing area when leaving said sterile area, thereby to decrease the risk of contaminating said sterile area and said patient after surgery.

10. The mobile ambulatory surgery center of claim 9, further including a retractable handicapped lift entering into said nonsterile area.

11. The mobile ambulatory surgery center of claim 9, further including a nurse's station at said entrance into said sterile area control ingress into said sterile area.

12. The mobile ambulatory surgery center of claim 9 wherein said operating room includes an emergency exit.

13. The mobile ambulatory surgery center of claim 9 wherein said center is arranged so that said sterile area exit door leads to said admitting area.

14. A method of facilitating sterile elective surgery, comprising:

(a) providing a mobile vehicle capable of being driven on a highway and having equipment for surgery to be performed, (b) providing in said mobile vehicle a main body section having sterile and nonsterile areas, (c) providing in said sterile area an outwardly expandable section for enlarging said sterile area, (d) providing said nonsterile area with an admitting area and a separate changing area which is positioned between said admitting area and said sterile area, (e) providing a wall which separates said admitting area from said separate changing area, said wall having a changing-area entrance door so that said admitting area and said separate changing area can be completely separated from each other, (f) providing a wall which separates said changing area from said sterile area, said wall having a changing-area exit door so that said separate changing area and said sterile area can be completely separated from each other, said separate changing area thereby having two doors, the changing-area entrance door and the changing-area exit door, (g) providing said sterile area with an exit door leading to an area other than said changing area so that a patient can exit said sterile area without passing through said changing area, and (h) expanding said sterile area by expanding said outwardly expandable section, (i) whereby patients will not be able to enter said sterile area directly from said admitting area, and will not have to pass through said changing area when leaving said sterile area, thereby to decrease the risk of contaminating said sterile area and said patient after surgery.

15. The method of claim 14, further including providing above-atmospheric pressure in said operating room to prevent contamination by airborne microorganisms.

16. The method of claim 14, further including providing stairs leading into said nonsterile area.

17. The method of claim 14, further including providing a nurse's station at said entrance to said sterile area for control ingress to said sterile area.

18. The method of claim 14, further including providing a waste storage room in said sterile area for storing waste produced by a surgery and preventing contamination of surgery patients.

19. The method of claim 18, further including providing said waste storage room with a soiled storage access panel for removing surgery waste from said waste storage room from outside the vehicle.

20. The method of claim 14 further including arranging said center so that said sterile area exit door leads to said admitting area.

\* \* \* \* \*